(12) United States Patent
Sannino et al.

(10) Patent No.: US 6,661,611 B1
(45) Date of Patent: Dec. 9, 2003

(54) FUNNELED TRENCH AAB INCREASED CONTACT STIFFNESS AND ENHANCED TAKE-OFF PERFORMANCE

(75) Inventors: Anthony P. Sannino, Longmont, CO (US); Mark A. Chapin, Louisville, CO (US); Michael D. Mundt, Longmont, CO (US); Scott E. Ryun, Prior Lake, MN (US); Ram M. Rao, Roseville, MN (US); Deborah S. Schnur, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 139 days.

(21) Appl. No.: 09/931,143

(22) Filed: Aug. 16, 2001

Related U.S. Application Data (60) Provisional application No. 60/237,962, filed on Oct. 4, 2000.

(51) Int. Cl.$^7$ ................................................. G11B 5/60
(52) U.S. Cl. ............................ 360/236.3; 360/235.8; 360/235.7
(58) Field of Search ..................... 360/235.6, 235.7, 360/235.8, 236.1, 236.3

(56) References Cited

U.S. PATENT DOCUMENTS

| | | | |
|---|---|---|---|
| 4,218,715 A | 8/1980 | Garnier | 360/103 |
| 4,475,135 A | 10/1984 | Warner et al. | 360/103 |
| 4,644,641 A | 2/1987 | Verdone | 29/603 |
| 4,984,114 A | 1/1991 | Takeuchi et al. | 360/103 |
| 5,062,017 A | 10/1991 | Strom et al. | 360/103 |
| 5,343,343 A | 8/1994 | Chapin | 360/103 |
| 5,396,386 A | 3/1995 | Bolasna et al. | 360/103 |
| 5,798,889 A | 8/1998 | Dorius et al. | 360/103 |
| 6,072,662 A * | 6/2000 | Utsunomiya | 360/236.1 |
| 6,188,547 B1 | 2/2001 | Gui et al. | 360/236.5 |

OTHER PUBLICATIONS

Bogy et al., "Reliability Criteria for Dynamic Load/Unload", Computer Mechanics Laboratory Research Report, Dept. of Mechanical Engineering, University of California Berkeley, 1999.

Yong Hu et al., "Partial Contact Air Bearing Characteristics of Tripad Sliders for Proximity Recording", Transaction of the ASME, vol. 120, 1998.

* cited by examiner

*Primary Examiner*—Robert S. Tupper
(74) *Attorney, Agent, or Firm*—Kinney & Lange, P.A.

(57) ABSTRACT

A slider for supporting a transducing head proximate to a rotating disc. The slider has a slider body having a disc opposing face and a longitudinal axis. The disc opposing face is bounded by a leading edge, a trailing edge, and first and second side edges. An air bearing surface is defined on the disc opposing face with the air bearing surface having at least one pad located behind the leading edge. A cavity is positioned on the disc opposing face and the cavity is recessed from the air bearing surface at a cavity depth. At least a portion of the cavity precedes the pad. A funnel directs airflow within the cavity from the leading edge to the pad.

20 Claims, 11 Drawing Sheets

FUNNELED TRENCH AAB INCREASED CONTACT STIFFNESS AND ENHANCED TAKE-OFF PERFORMANCE

CROSS-REFERENCE TO RELATED APPLICATION(S)

This application claims priority from Provisional Application No. 60/237,962, filed Oct. 4, 2000, for "FUNNELED TRENCH AAB FOR INCREASED CONTACT STIFFNESS AND ENHANCED TAKE-OFF PERFORMANCE" by Anthony P. Sannino, Mark A. Chapin, Michael D. Mundt, Scott E. Ryun, Ram Mohan Rao, and Deborah S. Schnur.

BACKGROUND OF THE INVENTION

The present invention relates to an air bearing slider for carrying a transducing head in a disc drive. More particularly it relates to an air bearing slider capable of operating at ultra-low flying heights.

Air bearing sliders have been extensively used in disc drives to appropriately position a transducing head above a rotating disc. In most high capacity storage applications, when the disc is at rest, the air bearing slider is in contact with the disc. During operation, the disc rotates at high s speeds, which generates a wind of air immediately adjacent to the flat surface of the disc. This wind acts upon a lower air bearing surface of the slider and generates a lift force directing the slider away from the disc and against a load beam causing the slider to fly at an ultra-low height above the disc. In negative pressure sliders, the wind also acts upon a portion of the air bearing surface of the slider to generate a suction force. The suction force counteracts the lift force by pulling the slider back toward the surface of the disc. A slider is typically mounted on a gimbal and load beam assembly which biases the slider toward the rotating disc, providing a pre-load force opposite to the lift force acting on the air bearing surface of the slider. For the slider to maintain the ultra-low flying height above the surface of the disc the lift force must be balanced with the pre-load and suction forces.

As disc storage systems are designed for greater and greater storage capacities, the density of concentric data tracks on discs is increasing (that is, the size of data tracks and radial spacing between data tracks is decreasing), requiring that the air bearing gap between the transducing head carried by the slider and the rotating disc be reduced. One aspect of achieving higher data storage densities in discs is operating the air bearing slider at ultra-low flying heights. Shrinking the air bearing gap and operating the slider at ultra-low flying heights has become a source of intermittent contact between the transducing head and the disc. Furthermore, when a disc drive is subjected to a mechanical shock of sufficient amplitude, the slider may overcome the biasing pre-load force of the load beam assembly and further lift away from or off the disc. Damage to the disc may occur when the slider returns to the disc and impacts the disc under the biasing force of the load beam. Such contact can result in catastrophic head-disc interface failure. Damage to the disc may include lost or corrupted data or, in a fatal disc crash, render the disc drive inoperable. Contact resulting in catastrophic failure is more likely to occur in ultra-low flying height systems. In addition, intermittent contact induces vibrations detrimental to the reading and writing capabilities of the transducing head.

For the disc drive to function properly, the slider must maintain the proper fly height and provide adequate contact stiffness to assure that the slider does not contact the disc during operation. Also, the air bearing slider must have enhanced take-off performance at start up to limit contact between the slider and the disc. Such contact would cause damage to the slider during take-off and landing of the slider.

Air bearing sliders typically possess three primary degrees of movement, which are vertical motion, pitch, and roll rotation. The movement is relative to the gimbal and load beam associated with three applied forces upon the slider defined as pre-load, suction, and lift force. Steady state fly attitude for the slider is achieved when the three applied forces balance each other. Variations in disc drive manufacturing, such as pitch static angle or pre-load variation, result in varying fly attitude and intermittent contact with the disc. However, increasing pitch and vertical stiffness of the air bearing slider results in a greater resistance to varying fly heights. Increasing stiffness of the slider is achieved by generating more suction and lift force per unit area on the air bearing surface of the slider.

Air bearing slider designs are known in the art that increase the suction force. However there is a need in the art for a slider capable of generating greater localized lift force. Larger suction and lift forces yield greater contact stiffness, enhance take-off performance and improve dampening capability. In general, increasing the suction and lift forces lowers manufacturing sensitivity and minimizes intermittent contact between the slider and the disc.

BRIEF SUMMARY OF THE INVENTION

The present invention is a slider for supporting a transducing head proximate a rotating disc. The slider has a slider body having a disc opposing face and a longitudinal axis. The disc opposing face is bounded by a leading edge, a trailing edge, and first and second side edges. An air bearing surface is defined on the disc opposing face, with the air bearing surface having at least one pad behind the leading edge. A cavity is positioned on the disc opposing face and the cavity is recessed from the air bearing surface at a cavity depth. At least a portion of the cavity precedes the pad. A funnel directs air flow within the cavity from the leading edge toward the pad.

Another embodiment of the present invention has at least one trench positioned adjacent to the pad. The trench is recessed from the air bearing surface at a step depth.

DETAILED DESCRIPTION

Figure 1:
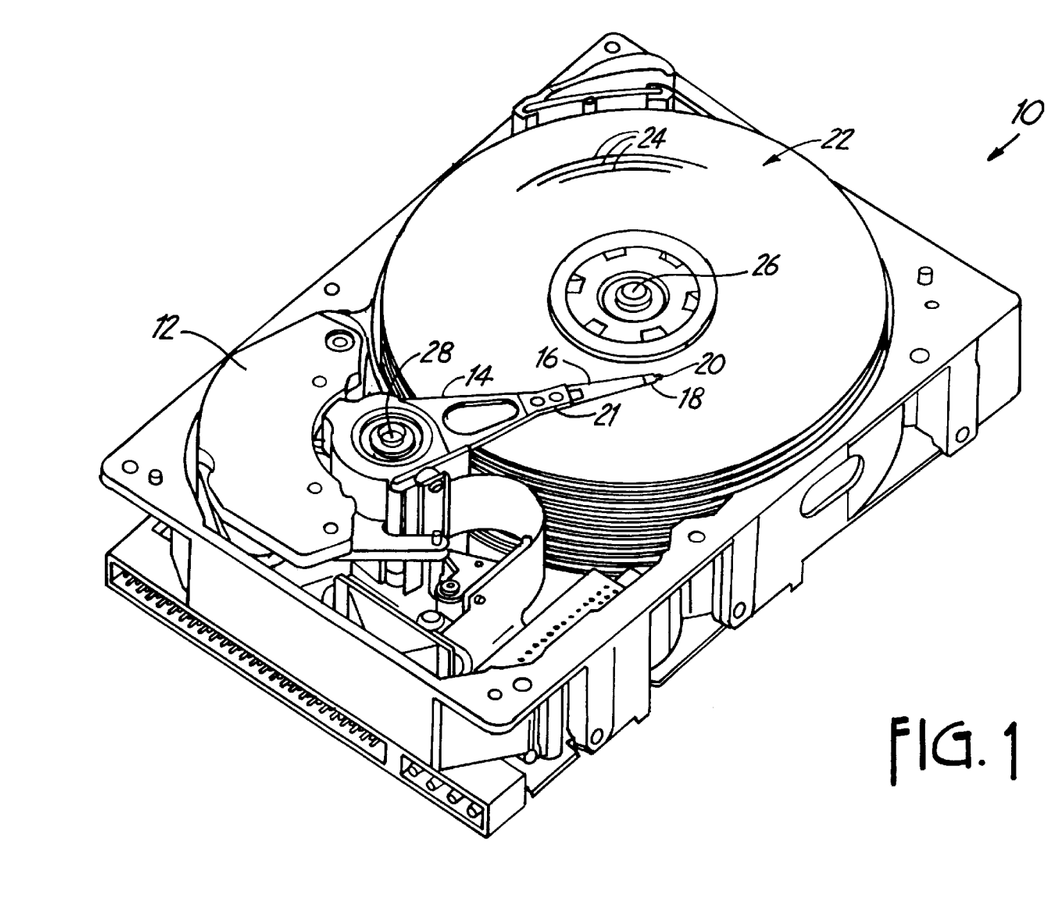
FIG. 1 shows a top perspective view of a disc drive actuation system for positioning a slider over tracks of a disc.

FIG. 1 shows a top perspective view of a disc drive actuation system 10 for positioning a transducing head (shown in FIG. 2) over a track of a disc as known in the prior art. The actuation system 10 includes a voice coil motor (VCM) 12, an actuator arm 14, a suspension 16, a flexure 18, and a slider 20. Slider 20 is connected to the distal end of the suspension 16 by the flexure 18. Suspension 16 is connected to actuator arm 14 at a head mounting block 21, while actuator arm 14 is coupled to VCM 12. As shown on the right side of FIG. 1, the disc drive assembly includes a disc 22, having a multiplicity of tracks 24, which rotates about an axis 26. During operation of the disc drive assembly, rotation of disc 22 generates air movement which is encountered by slider 20. This air movement acts to keep slider 20 aloft a small distance above the surface of disc 22 allowing the slider to fly above the surface of disc 22. VCM 12 is selectively operated to move actuator arm 14 around an axis 28 thereby moving suspension 16 and positioning the transducing head (not shown) carried by slider 20 between tracks 24 of disc 22. Proper positioning of the transducing head is necessary for reading and writing data on the concentric tracks 24 of disc 22.

Figure 2:
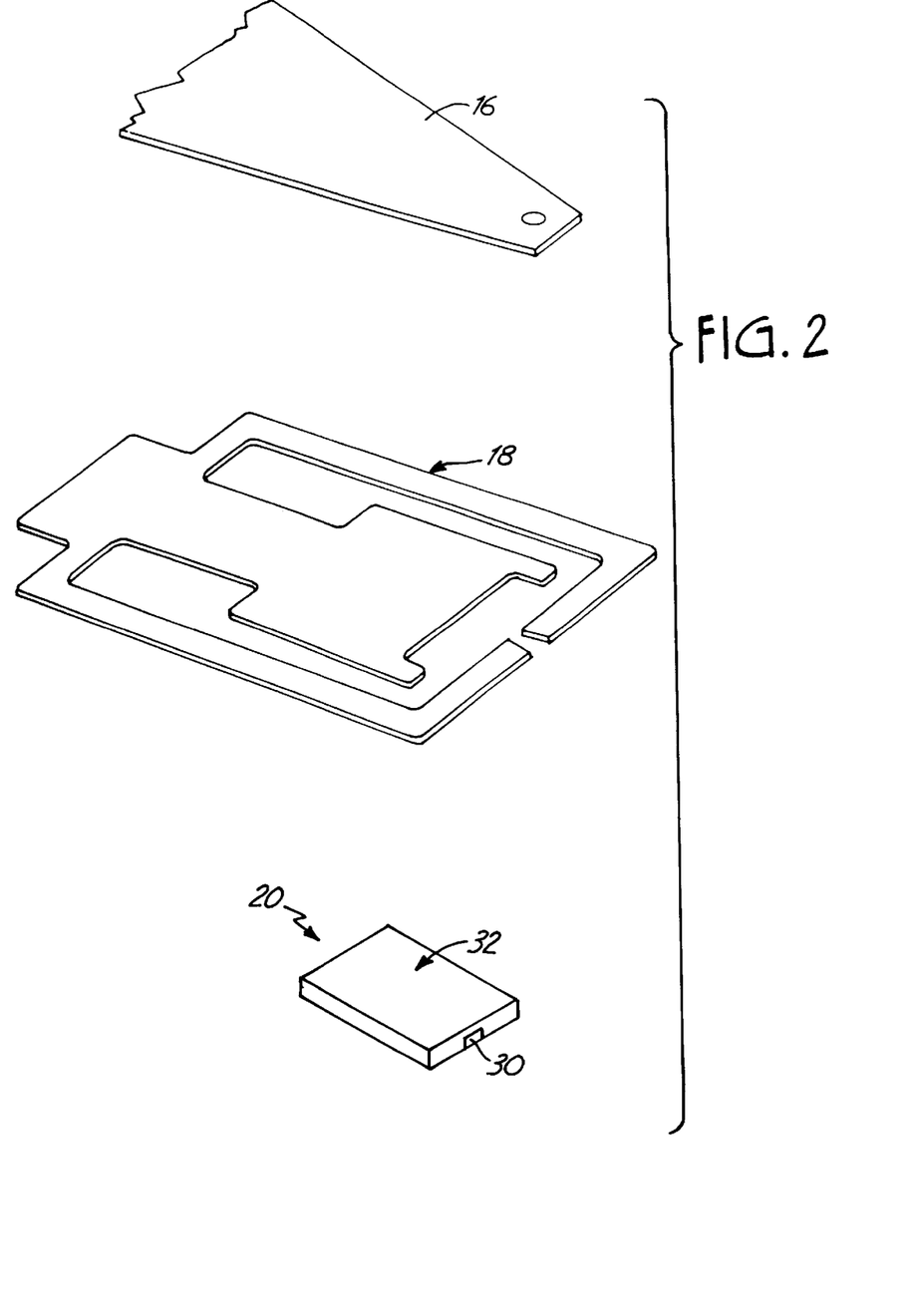
FIG. 2 shows an exploded perspective view of the distal portion of the disc drive actuation system of FIG. 1.

FIG. 2 is an exploded perspective view of the distal portion of a disc drive actuation system 10 (shown in FIG. 1) as known in the prior art. Shown in FIG. 2, from top to bottom is suspension 16, flexure 18, and slider 20 carrying a transducing head 30. Flexure 18 is attached to suspension 16 and slider 20 attaches to a bottom surface of flexure 18. Transducing head 30 is carried by slider 20. Flexure 18 provides a spring connection between slider 20 and suspension 16. Air bearing slider 20 includes a disc opposing face (not shown) and a flexure opposing face 32. Flexure opposing face 32 is attached to the bottom surface of flexure 18. Flexure 18 is configured such that it allows slider 20 to move in pitch and roll directions. Many different types of flexures 18, also known as gimbals, are known to provide the spring connection allowing for pitch and roll movement of slider 20 and can be used with the present invention. Transducing head 30 is carried by slider 20 to write and read data to and from disc 22. In operation suspension 16 and flexure 18 carrying slider 20 are all moved together as coarse positioning is performed by VCM 12 (FIG. 1) to move actuator arm 14 (FIG. 1).

Figure 3:
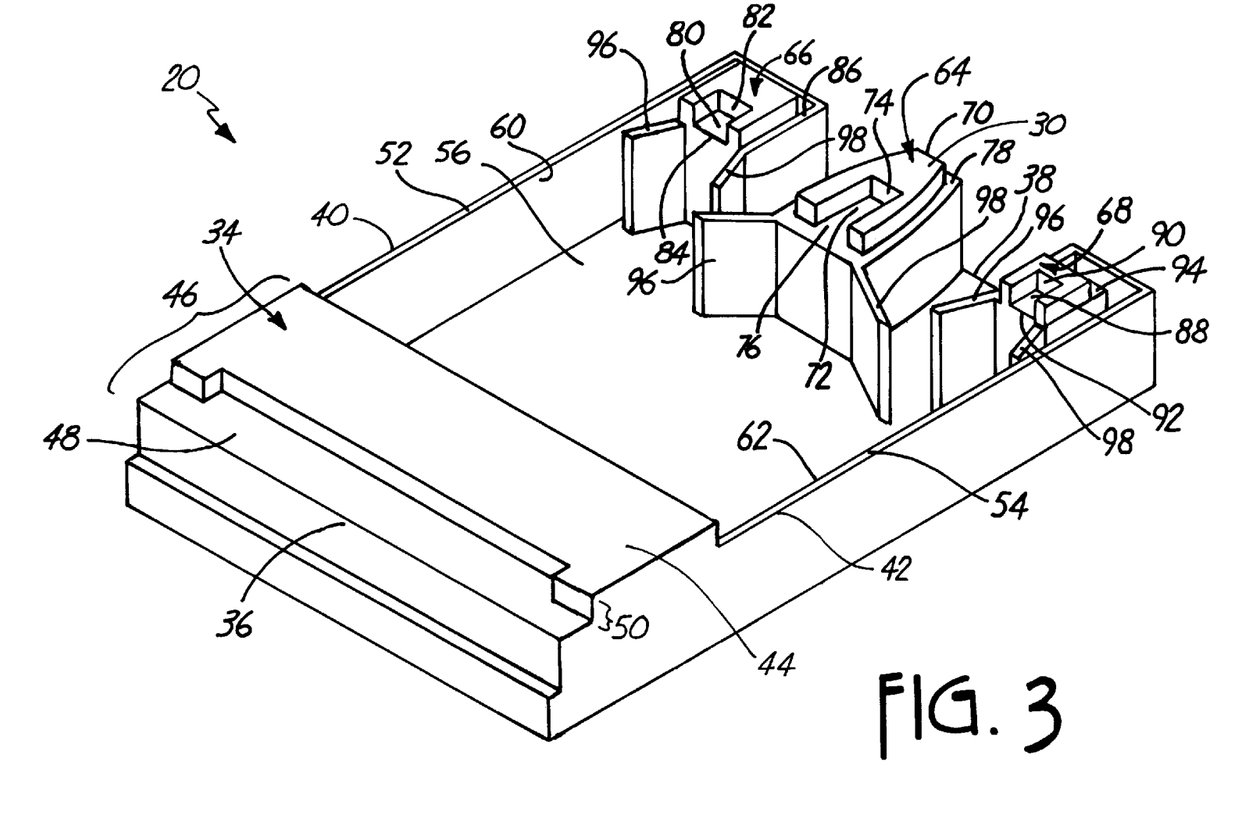
FIG. 3 shows a bottom perspective view of a first embodiment of a slider.

FIG. 3 is a bottom perspective view of a first embodiment of slider 20. Slider 20 has a disc opposing face 34 bounded by a leading edge 36, a trailing edge 38, a first side edge 40, and a second side edge 42. Leading edge 36 and trailing edge 38 are substantially parallel to each other, and two side edges 40 and 42 are substantially parallel to each other, although those skilled in the art will recognize other configurations are possible for the slider body, including trapezoidal shapes. During operation disc opposing face 34 is directed toward disc 22 (FIG. 1).

The contour of disc opposing face 34 of air bearing slider 20 has a significant effect on the flying characteristics of air bearing slider 20, and various contours have been proposed and used for air bearing sliders. Examples of two of these are included in U.S. Pat. No. 5,062,017 by Strom, et al. and U.S. Pat. No. 5,343,343 by Chapin, both of which are assigned to Seagate Technology Inc. and are hereby incorporated by reference. The slider must maintain adequate roll-pitch and normal stiffness over the predetermined concentric data track, corresponding to a range of operating speeds, and over a predetermined range of skew angles.

Disc opposing face 34 of slider 20 defines an air bearing surface 44. Air bearing surface 44 is the reference level for slider 20, or slider body. A cross rail 46 is positioned behind leading edge 36. Cross rail 46 extends from first side edge 40 to second side edge 42. Cross rail 46 typically has a height equal to air bearing surface 44, however a front portion 48 of cross rail 46 is recessed from air bearing surface 44 at a step depth 50. Step depth 50 is preferably between approximately 0.1 microns and approximately 0.3 microns.

A first border wall 52 is positioned along first side edge 40 and a second border wall 54 is positioned along second side edge 42. Border walls 52 and 54 extend from cross rail 46 to trailing edge 38. First border wall 52 and second border wall 54 are disposed substantially parallel to each other. Both border walls 52 and 54 are recessed from air bearing surface 44 at a depth equal to step depth 50. Border walls 52 and 54 have a width preferably between approximately 10 microns and approximately 100 microns.

A cavity 56 is positioned on disc opposing face 34. Cavity 56 is recessed from air bearing surface 44 at a cavity depth 58 (shown in FIGS. 4A and 4B). Cavity depth 58 of cavity 56 is preferably between approximately 1 micron and approximately 3 microns. First border wall 52 has an inner face 60 facing cavity 56 and second border wall 54 has an inner face 62 facing cavity 56. Cavity 56 is bounded by cross rail 46, inner face 60 of first border wall 52, and inner face 62 of second border wall 54.

A center pad 64, a first side pad 66 and a second side pad 68 are positioned proximate to trailing edge 38. Each pad 64, 66, and 68 has a height equal to air bearing surface 44. Center pad 64 is located substantially along the longitudinal axis of slider 20. Transducing head 30 is located on center pad 64. A pole tip 70 of transducing head 30 is located on air bearing surface 44 approximately where the longitudinal axis of slider 20 intersects trailing edge 38. First side pad 66 is located approximately at the intersection between trailing edge 38 and first side edge 40. Preferably, first side pad 66 is connected to first border wall 52. Second side pad 68 is located approximately at the intersection of trailing edge 38 and second side edge 42. Preferably, second side pad 68 is connected to second border wall 54.

A center trench 72, at step depth 50, is positioned within center pad 64. Center trench 72 has a back wall 74 formed by center pad 64, and an inlet 76. Inlet 76 lies closer to leading edge 36 than back wall 74 and inlet 76 is disposed substantially parallel to leading edge 36. An outer perimeter 78, at step depth 50, surrounds center pad 64. Outer perimeter 78 intersects with center trench 72 at inlet 76.

A first side trench 80, at step depth 50, extends into first side pad 66. First side trench 80 has a back wall 82 formed by first side pad 66, and an inlet 84. Inlet 84 lies closer to leading edge 36 than back wall 82. Inlet 84 is disposed substantially parallel to leading edge 36. An outer perimeter 86, at step depth 50, surrounds portions of first side pad 66. Outer perimeter 86 intersects with first side trench 80 at inlet 84. A second side trench 88, at step depth 50, extends into second side pad 68. Second side trench 88 has a back wall 90 formed by second side pad 68, and an inlet 92. Inlet 92 lies closer to leading edge 36 than back wall 90, and inlet 92 is disposed substantially parallel to leading edge 36. An outer perimeter 94, at step depth 50, surrounds portions of second side pad 68. Outer perimeter 94 intersects with second side trench 88 at inlet 92. Trenches 72, 80, and 88 have a length extending from their inlet 76, 84 and 92 to their back wall 74, 82 and 90. Preferably, the length of the trench is equal to approximately half of the length of its respective pad. Additionally, the length to width ratio of the trench is preferably greater than one. Those skilled in the art will recognize that additional embodiments of slider 20 may include fewer or more of the trenches.

Pads 64, 66, and 68 have a first arm 96 and a second arm 98 extending from each pad. First arm 96 and second arm 98 redirect air flow within cavity 56 from leading edge 36 into trenches 72, 80, and 88. Arms 96 and 98 are at step depth 50. Each trench 72, 80, and 88 has its own set of arms 96 and 98. First arm 96 extends relative to the longitudinal axis of slider 20 at a positive angle preferably greater than zero degrees and less than 90 degrees, and most preferably greater than 5 degrees and less than 60 degrees. In the first embodiment first arm 96 extends from the trenches at a positive angle of approximately 55 degrees. In the first embodiment, second arm 98 extends relative to the longitudinal axis of slider 20 at a negative angle preferably greater than zero degrees and less than 90 degrees, and most preferably greater than 5 degrees and less than 60 degrees. Second arm 98 extends from the trenches at a negative angle of approximately 55 degrees. The lengths of arms 96 and 98 are approximately 100 microns. Preferably, the length of the arm is approximately equal to the length of its respective trench. However, those skilled in the art will realize the length of the arm may have a different ratio to the length of its respective trench and that the lengths of arms 96 and 98 do not have to be equal.

Figure 4:
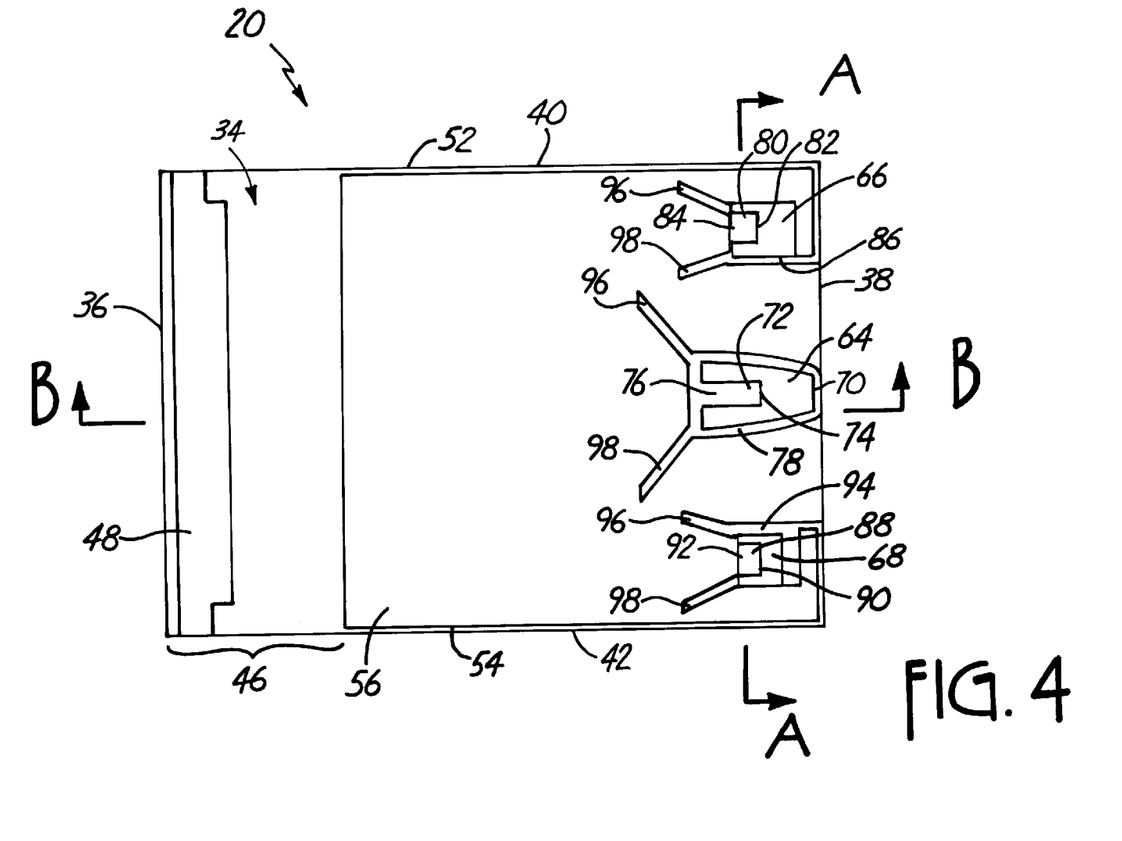
FIG. 4 shows a bottom view of the first embodiment of the slider of FIG. 3.
Figure 4A:
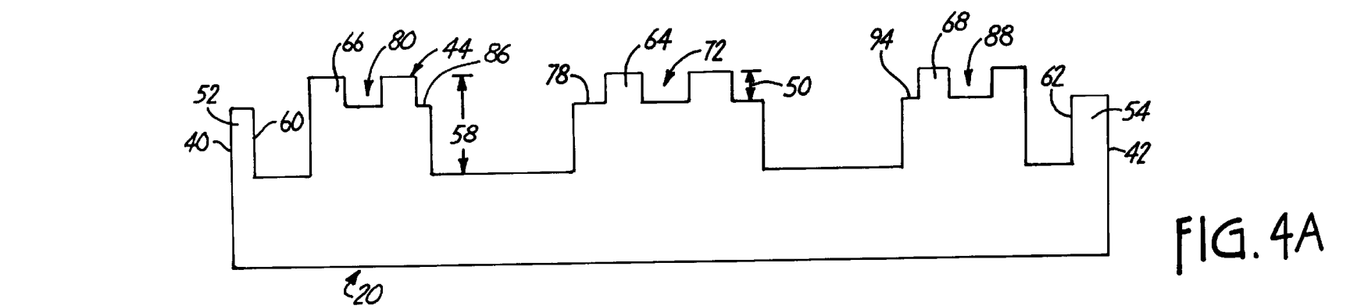
FIG. 4A shows a cross-sectional view of FIG. 4 taken along line A—A.
Figure 4B:
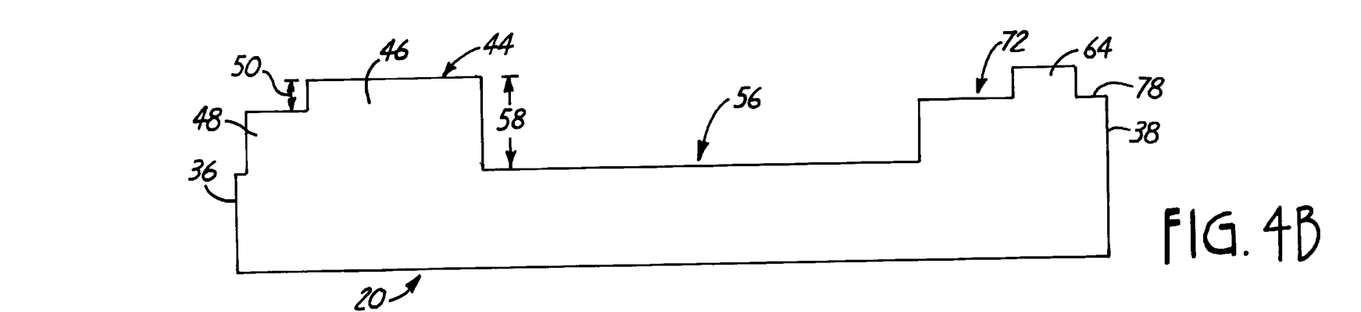
FIG. 4B shows a cross-sectional view of FIG. 4 taken along line B—B.

FIG. 4 shows a bottom view of the slider 20. FIG. 4A is a cross-sectional view of slider 20 taken along line A—A of FIG. 4 and FIG. 4B is a cross-sectional view of slider 20 taken along line B—B of FIG. 4. FIGS. 4A and 4B illustrate the contours of disc opposing face 34 of the first embodiment of slider 20. Slider 20 has air bearing surface 44 which is the tallest surface of slider 20 and provides a reference level. Pads 64, 66 and 68, as well as cross rail 46, have a height equal to air bearing surface 44. The trenches (72, 80 and 88), front portion 48 of cross rail 46 and the outer perimeters (78, 86 and 94) are recessed from air bearing surface 44 at step depth 50. Cavity 56 is recessed from air bearing surface 44 at cavity depth 58.

With reference to FIG. 4, in operation slider 20 flies over the surface of disc 22 (FIG. 1) with disc opposing face 34 facing the disc. At startup, the disc rotates about its axis which generates a wind of air immediately adjacent to the surface of the disc. This air flows in relation to disc opposing face 34 of slider 20 from leading edge 36 towards trailing edge 38. The air comes over leading edge 36 and cross rail 46 and then redistributes itself within cavity 56. The air traveling over cross rail 46 generates a negative pressure or a suction force within cavity 56 behind cross rail 46 and forward of pads 64, 66 and 68. The suction force pulls slider 20 downward towards the disc. Suspension 16 (FIG. 1) and flexure 18 (FIG. 1) exert a pre-load force upon slider 20. The pre-load force pushes slider 20 downward toward the disc.

For slider 20 to fly at an ultra-low height above the surface of the disc during operation, a force must be generated to lift and maintain slider 20 at a height above the disc. The air traveling through cavity 56 continues towards trailing edge 38 of slider 20. A portion of the air is directed, or funneled, into trenches 72, 80, and 88 by arms 96 and 98. Confining the air within trenches 72, 80, and 88 generates a lift force and increased pressurization on the pads, thereby pushing slider 20 upward and away from the disc. The lift force balances the suction and pre-load forces and enables the slider 20 to maintain an ultra-low flying height above disc 22. Arms 96 and 98 direct the air traveling through cavity 56 into trenches 72, 80, and 88 and amplify the pressure and lift force acting on pads 64, 66 and 68. Arms 96 and 98 provide more air to the trenches to pressurize more efficiently and also deplete more air from cavity 56 resulting in larger lift and suction forces on slider 20.

While slider 20 is flying over the surface of the disc various factors such as mechanical shock and variations in the air flow cause slider 20 to contact the disc or not maintain a steady flying height. Air bearing sliders typically possesses three primary degrees of movement which are vertical motion, pitch, and roll rotation. Slider 20 moves about these axes during its flight above the disc. In the present invention, to maintain an ultra-low flying height and to prevent intermittent contact with the disc, the contact stiffness of slider 20 is increased. Contact stiffness is defined by the slider pitch stiffness and the slider vertical stiffness, and is also characterized by the vertical stiffness of the slider at the location of pole tip 70. Contact stiffness is defined as follows:

$$K_c = \frac{K_p}{\frac{K_p}{K_z} + b^2}.$$

$K_c$ is the contact stiffness (mg/nm), $K_p$ is the slider pitch stiffness ($\mu$N·M/$\mu$rad), $K_z$ is the slider vertical stiffness (gmf/nm) and b is the distance (nm) between the slider pivot point and pole tip 70. Steady state fly attitude and increased contact stiffness occur when the three applied forces (pre-load force, suction force, and lift force) balance each other. To increase the contact stiffness (pitch and vertical stiffness) of the slider requires generating more suction and lift force on the air bearing surface 44 of slider 20. Arms 96 and 98, which funnel the air traveling through cavity 56 into trenches 72, 80, and 88, cause an increase in pressurization on pads 64, 66 and 68 and thereby increase lift force on slider 20 by localizing and amplifying pressurization within the trenches. Methods to increase the suction force are known in the art, including optimizing step depth 50 and cavity depth 58 so that more pressure is created within cavity 56 proximate cross rail 46 and increasing the surface area of cavity 56, to generate more suction force.

Figure 5:
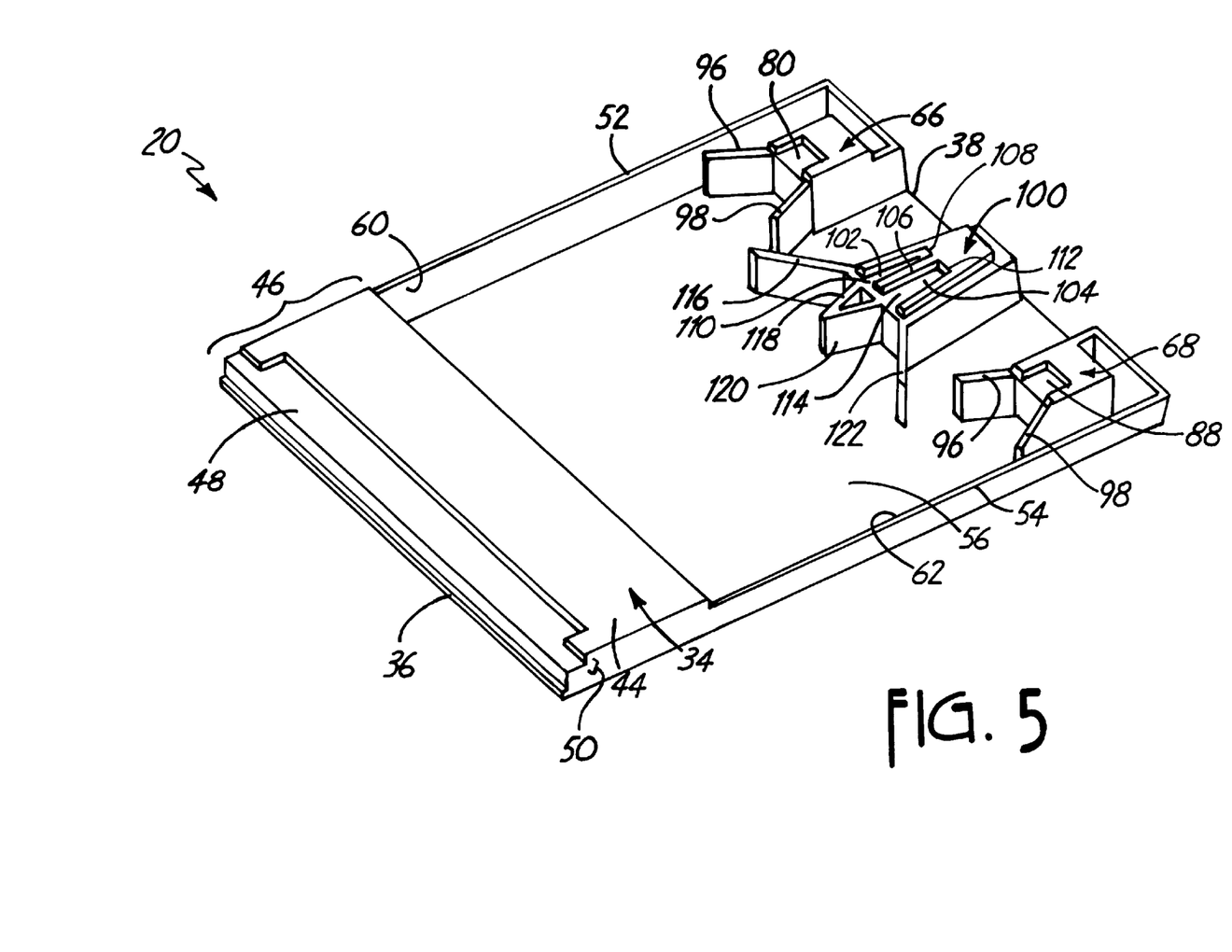
FIG. 5 shows a bottom perspective view of a second embodiment of a slider of the present invention.
Figure 6:
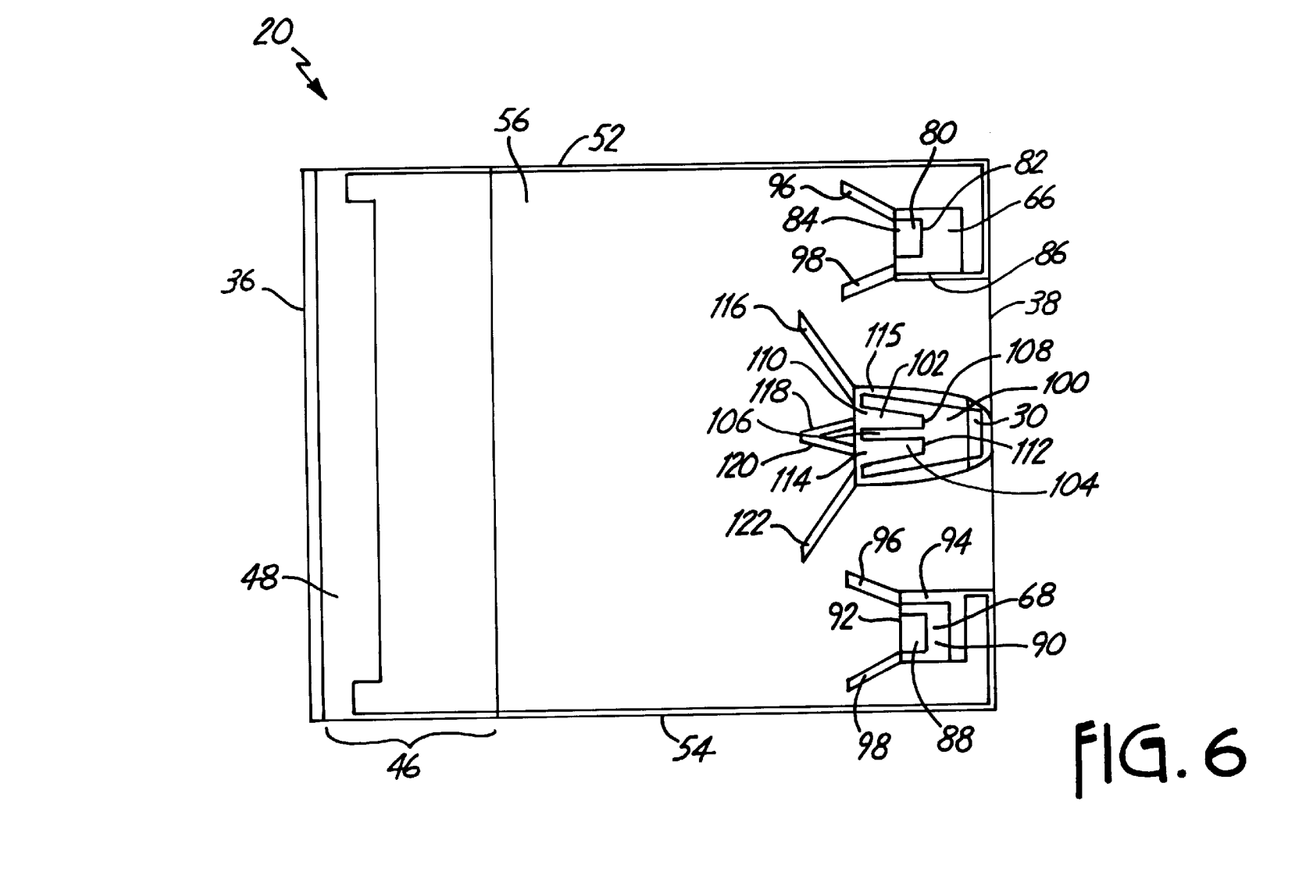
FIG. 6 shows a bottom view of the second embodiment of the slider shown in FIG. 5.

A second embodiment of slider 20 is shown in FIGS. 5 and 6. The second embodiment of slider 20 has the same basic structure as described with respect to the first embodiment in FIGS. 3 and 4. FIG. 5 shows a bottom perspective view of the second embodiment of slider 20. The second embodiment of slider 20 includes disc opposing face 34, cross rail 46, border walls 52 and 54, cavity 56, and side pads 66 and 68. First side pad 66 and second side pad 68 of the second embodiment of slider 20 have side trenches 80 and 88 (and their respective arms 96 and 98) adjacent the pads to generate a greater localized lift force as described with respect to FIGS. 3 and 4.

The contour of disc opposing face 34 on the second embodiment of slider 20 varies from the first embodiment of slider 20. The second embodiment of slider 20 includes a center pad 100. Center pad 100 is positioned proximate to trailing edge 38 and is located substantially along the longitudinal axis of slider 20. Center pad 100 has a height equal to air bearing surface 44.

Two trenches, a first center trench 102 and a second center trench, 104 are positioned within center pad 100. Center trenches 102 and 104 are recessed from air bearing surface 44 at step depth 50. A wall 106 formed from center pad 100 and having a height equal to air bearing surface 44 separates first center trench 102 from second center trench 104. First center trench 102 has a back wall 108 formed by center pad 100, and an inlet 110. Second center trench 104 has a back wall 112 formed by center pad 100, and an inlet 114. Inlets 110 and 114 lie closer to leading edge 36 than back walls 108 and 112. Inlets 110 and 114 are disposed substantially parallel to leading edge 36. Preferably, an outer perimeter 115 surrounds center pad 100 at step depth 50. Outer perimeter 115 intersects with center trenches 102 and 104 at inlets 110 and 114.

A set of arms extends from each center trench 102 and 104 to direct air flow within cavity 56 into center trenches 102 and 104. A first arm 116 and a second arm 118 extend from first center trench 102. A third arm 120 and a fourth arm 122 extend from second center trench 104. First arm 116 extends relative to the longitudinal axis of slider 20 at a positive angle. Second arm 118 extends relative to the longitudinal axis at a negative angle. Third arm 120 extends relative to the longitudinal axis at a positive angle. Fourth arm 122 extends relative to the longitudinal axis at a negative angle. Arms 116 and 122 extend at angles preferably greater than zero degrees and less than 90 degrees, most preferably greater than 5 degrees and less than 60 degrees, and in this embodiment approximately 55 degrees. Arms 118 and 120 extend at angles preferably greater than zero degrees and less than 90 degrees, most preferably greater than 5 degrees and less than 60 degrees, and in this embodiment approximately 15 degrees. Second arm 118 and third arm 120 intersect at their forward ends upstream from center pad 100. The length of first arm 116 and fourth arm 122 is approximately 150 microns. The length of second arm 118 and third arm 120 is approximately 100 microns.

FIG. 6 shows a bottom view of the second embodiment of slider 20. In use, the second embodiment of slider 20 operates in the same manner as the first embodiment of slider 20 described with respect to FIG. 4. In the second embodiment of slider 20, center pad 100 has two center trenches 102 and 104 generating lift force to push slider 20 upward and away from disc 22 (FIG. 1). The lift force balances the suction and preload forces and enables slider 20 to maintain an ultra-low flying height above the disc. The arms extending from each trench funnel the air traveling through cavity 56 into the trenches and confine the air to the trenches, thereby increasing the pressurization and lift force on center pad 100 by amplifying the pressure within the trenches.

Figure 7:
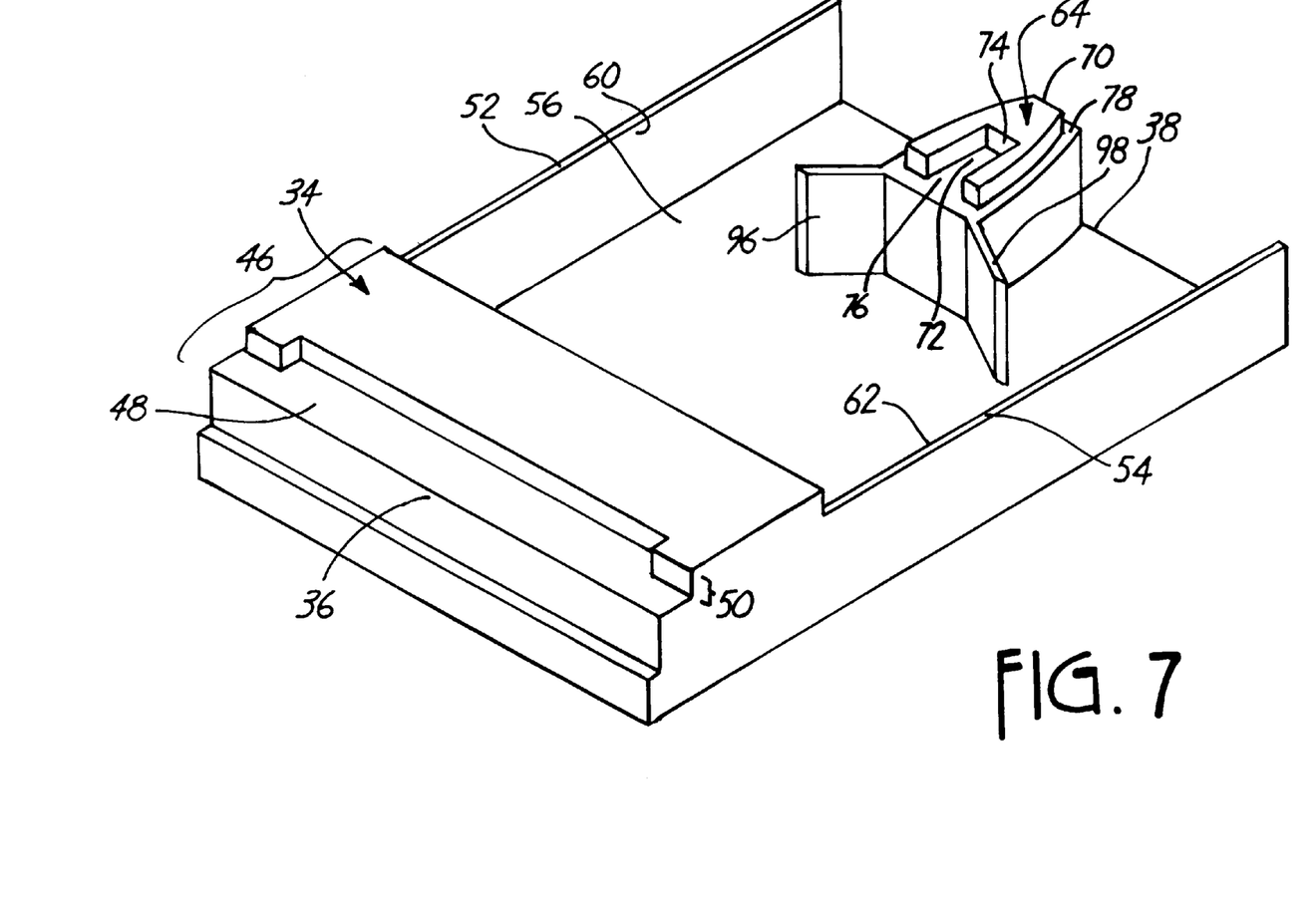
FIG. 7 shows a bottom perspective view of a third embodiment of a slider of the present invention.
Figure 8:
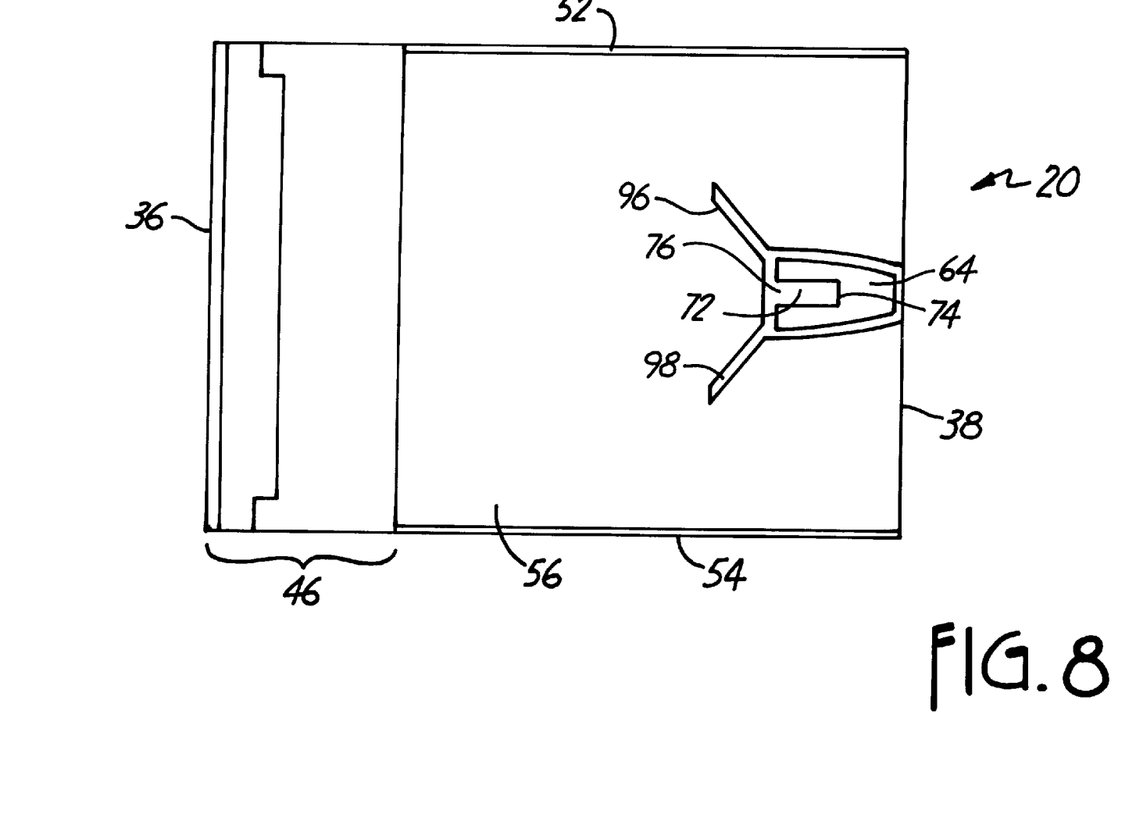
FIG. 8 shows a bottom view of the third embodiment of the slider shown in FIG. 7.

FIGS. 7 and 8 show a bottom perspective view and a bottom view respectively of a third embodiment of slider 20. The third embodiment of slider 20 has the same basic structure as described with respect to the first embodiment of slider 20 shown in FIGS. 3 and 4. The third embodiment of slider 20 does not have side pads 66 and 68 and side trenches 80 and 88 (with their respective arms 96 and 98) as recited by the first embodiment. The third embodiment of slider 20 includes disc opposing face 34, cross rail 46, border walls 52 and 54, cavity 56, center pad 64, center trench 72, and arms 96 and 98. In use, the third embodiment of slider 20 operates in the same manner as described with respect to the first embodiment.

Figure 9:
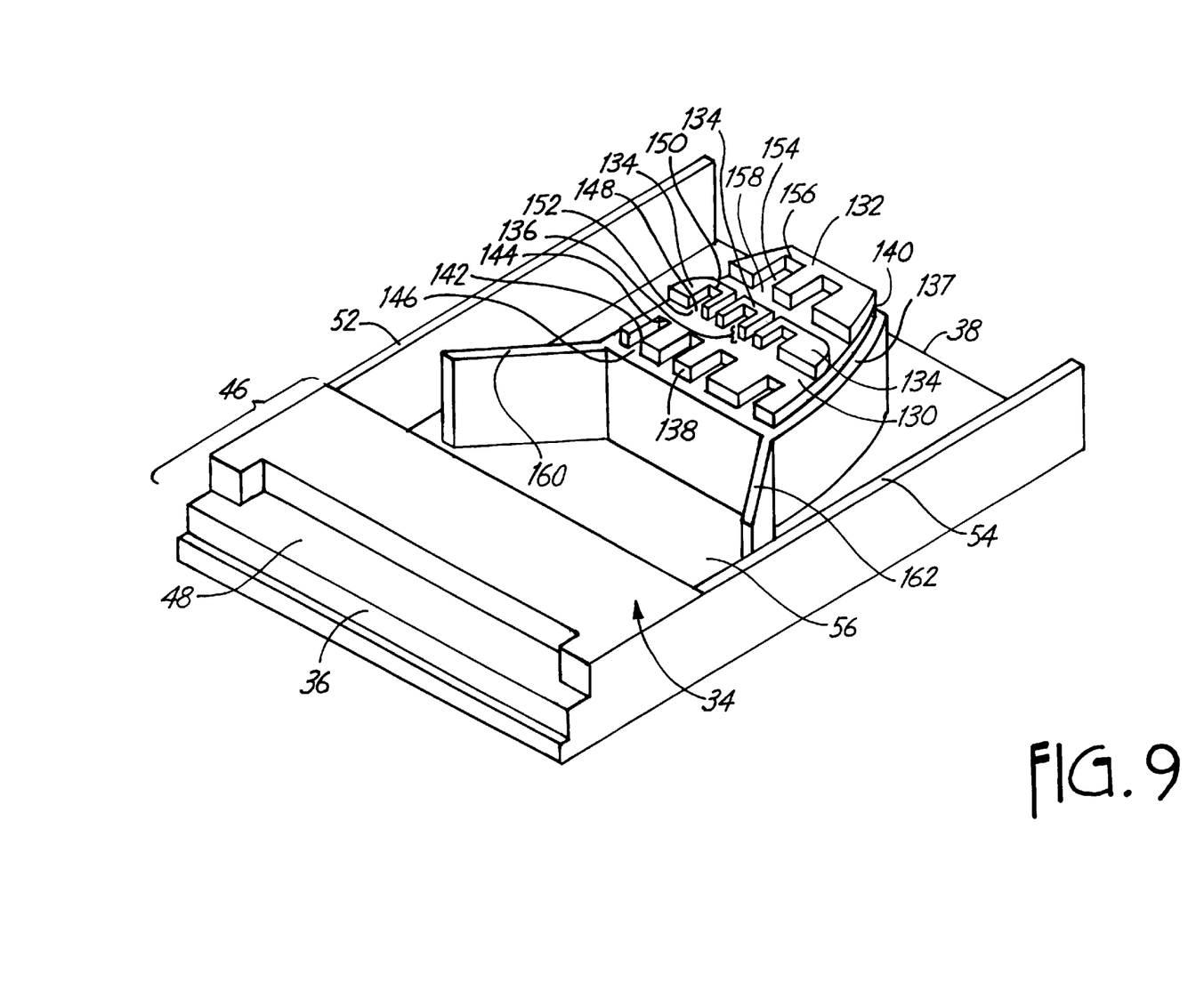
FIG. 9 shows a bottom perspective view of a fourth embodiment of a slider of the present invention.
Figure 10:
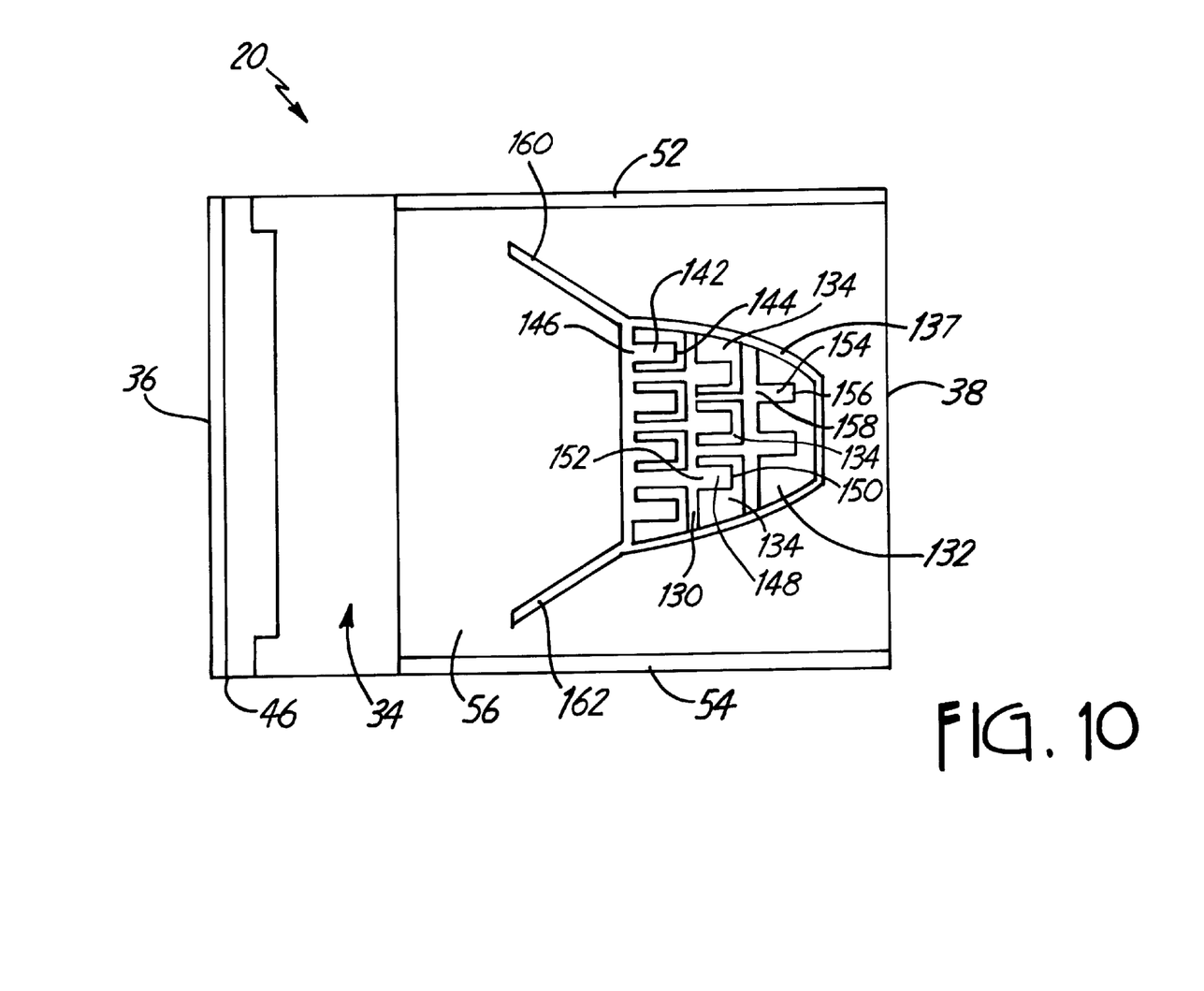
FIG. 10 shows a bottom view of the fourth embodiment of the slider shown in FIG. 9.

A fourth embodiment of slider 20 is shown in FIGS. 9 and 10. The fourth embodiment of slider 20 has the same basic structure as described with respect to the first embodiment of slider 20 shown in FIGS. 3 and 4. FIG. 9 illustrates a bottom perspective view of the fourth embodiment of slider 20. The fourth embodiment of slider 20 includes disc opposing face 34, cavity 56, cross rail 46, and border walls 52 and 54. Preferably the fourth embodiment of slider 20 does not have any side pads and side trenches (or their respective arms), although those skilled in the art will recognize side pads and side trenches may be added to the fourth embodiment.

A center pad 130 is positioned within cavity 56. Rear pad 132 and middle pads 134 are positioned on center pad 130. Rear and middle pads 132 and 134 have a height equal to air bearing surface 44. Center pad 130 is recessed from air bearing surface 44 at an intermediate depth 136. Intermediate depth 136 is preferably between about zero microns to about 0.3 microns. Center pad 130 is located substantially along the longitudinal axis of slider 20 and preferably positioned forward of trailing edge 38, although those skilled in the art will realize that a position along trailing edge 38 is possible. An outer perimeter 137, at step depth 50, surrounds center pad 130.

Center pad 130 has a forward edge 138 and a rear edge 140. Trenches 142 are positioned within pad 130 adjacent to forward edge 138. Each trench 142 has a back wall 144 formed by center pad 130. Trenches 142 also have an inlet 146 positioned adjacent forward edge 138 and substantially parallel to leading edge 36. Trenches 142 are preferably recessed from air bearing surface 44 at step depth 50.

Pads 132 and 134 are positioned rearward of trenches 142, with rear pad 132 positioned adjacent to rear edge 140 and middle pads 134 are positioned between trenches 142 and rear pad 132. A row of trenches 148 is positioned within middle pads 134. Trenches 148 are recessed from air bearing surface 44 at intermediate depth 136. Each trench 148 has a back wall 150 formed by pad 134 and an inlet 152 positioned substantially parallel to leading edge 36 and forward of back wall 150. A row of trenches 154 is positioned within rear pad 132. Trenches 154 are recessed from air bearing surface 44 at intermediate depth 136. Each trench 154 has a back wall 156 formed by pad 132 and an inlet 158 positioned substantially parallel to leading edge 36 and forward of back wall 156.

Pads 130, 132 and 134, along with trenches 142, 148 and 154, have a theater seating configuration and the trenches in adjacent rows are offset from each other. Trenches 142 form a front row adjacent forward edge 138 of center pad 130. Trenches 148 form a second row and trenches 154 form a rear row raised above trenches 142. Although slider 20 shows nine trenches positioned with respect to center pad 130, those skilled in the art will recognize that fewer or more trenches may be included in the embodiment, as well as fewer or more rows of trenches.

A set of arms extend from center pad 130 to direct airflow within cavity 56 into trenches 142, 148 and 154 through inlets 146, 152 and 158. A first side arm 160 extends from center pad 130 relative to the longitudinal axis of slider 20 at a positive angle greater than zero degrees and less than 90 degrees, most preferably greater than 5 degrees and less than 60 degrees, and in this embodiment approximately 40 degrees. A second arm 162 extends from center pad 130 relative to the longitudinal axis of slider 20 at a negative angle preferably greater than zero degrees and less than 90 degrees, most preferably greater than 5 degrees and less than 60 degrees, and in this embodiment approximately 40 degrees. The length of arms 160 and 162 are equal to approximately the length of center pad 130 along its longitudinal axis. Those skilled in the art will recognize that additional arms may be added to the fourth embodiment; for example, each trench may have a set of arms extending from the trench to direct air flow into the trench. Additionally, the ratio between the arm length and the pad length could be lower or greater.

For slider 20 to fly at an ultra-low height above the surface of the disc, a force is generated to lift and maintain slider 20 at a height above the disc. The air traveling through cavity 56 continues towards trailing edge 38 of slider 20. A portion of the air is directed, or funneled, by arms 160 and 162 into the trenches. Confining the air within trenches 142, 148 and 154 generates a lift force and increased pressurization on the pads, thereby pushing slider 20 upward and away from the disc. A portion of the air funneled by arms 160 and 162 is directed into trenches 142. A portion of that air passes along center pad 130 and is confined within trenches 148 of middle pads 134 and still more air flows past middle pads 134 and is confined within trenches 154 of rear pad 132.

The lift force balances the suction and pre-load force and enables the slider 20 to maintain an ultra-low flying height above disc 22. Arms 160 and 162 direct the air into trenches 142, 148 and 154 and amplify the pressure and lift force acting on pads 130, 132 and 134. Arms 160 and 162 provide more air to the trenches to pressurize more efficiently and also deplete more air from cavity 56 resulting in larger lift and suction forces on slider 20.

The air bearing sliders of the present invention fly at ultra-low flying heights over the surface of the disc. Flying at such low heights creates the risk of intermittent and undesirable contact between the slider and the disc. An effective way to prevent the slider from contacting the disc during flight is to increase the contact stiffness of the slider. Contact stiffness is a function of pitch and vertical stiffness acting on the slider.

In operation three applied forces act upon the slider. The lift force pushes the slider upward and away from the disc, while the suction and pre-load forces pull the slider downward towards the disk. To maintain the ultra-low flying height of the slider in a steady state the three forces (lift, suction, pre-load) balance each other such that the lift force is greater than the suction and pre-load forces combined.

Increasing the contact stiffness of the slider requires generating more suction and lift force per unit area on the air bearing surface of the slider. Slider designs are known in the art for increasing the suction force, however these designs do not address the problem of increasing localized lift force. The present invention sliders are configured such that they generate a greater lift force than is known in the art. The combination of a trench with two arms funneling air into the trench creates the greater lift force. The arms cause an increase in pressurization on the pad and an increase in lift force on the slider by amplifying the pressurization effect within the trench.

The trenched air bearing slider with arms to funnel air into the trenches enhances the take-off performance of the slider. At disc start-up, the increased lift force results in higher pressurization within the trenches at low velocities to lift the slider off the disc without resulting in the slider crashing back to the disc and causing damage.

Intermittent contact between the slider and the disc induces vibrations in the slider detrimental to the reading and writing capabilities of the transducing head. Increasing the lift force acting on the slider increases the contact stiffness of the slider. Increased contact stiffness has two effects on vibrational damage to the transducing head. First, increased contact stiffness keeps the slider in steady state flying at ultra-low heights over the disc such that the risk of intermittent contact is significantly lower than prior art slider designs. Second, the increased stiffness of the slider dampens the effect of vibrations on the slider. Furthermore, by increasing contact stiffness in the slider by generating greater lift force lowers the manufacturing sensitivity of the slider.

Although the present invention has been described with reference to preferred embodiments, workers skilled in the art will recognize that changes may be made in form and detail without departing from the spirit and scope of the invention. In particular the ratio of arm length to its respective trench may vary and does not have to be in direct relationship. Also, arms may vary in length with each other, or the arms may take other forms to direct or funnel the air towards the pads and trenches, such as being curved or stepped. In addition, the first and second side pads may be identical in size and shape.

What is claimed is:

1. A slider for supporting a transducing head proximate a rotating disc, the slider comprising:

a slider body having a disc opposing face bounded by a leading edge, a trailing edge, and first and second side edges, the slider body having a cavity positioned on the disc opposing face downstream of the leading edge;

an air bearing surface defined on the disc opposing face, the air bearing surface having at least one pad adjacent the trailing edge; and means for directing air from the cavity to the pad to generate a lift force.

2. A slider for supporting a transducing head proximate a rotating disc, the slider comprising:

a slider body having a disc opposing face bounded by a leading edge, a trailing edge, and first and second side edges, the slider body having a longitudinal axis;

an air bearing surface defined on the disc opposing face, the air bearing surface having at least one pad behind the leading edge;

a cavity positioned on the disc opposing face, wherein the cavity is recessed from the air bearing surface at a cavity depth, at least a portion of the cavity preceding the pad; and a funnel directing air flow within the cavity from the leading edge to the pad, the funnel extending from the pad.

3. The slider of claim 2 wherein the cavity depth is approximately 1 micron to approximately 3 microns.

4. The slider of claim 2, and further comprising:

a cross rail positioned along the leading edge and extending from the first side edge to the second side edge.

5. The slider of claim 2, and further comprising:

first and second border walls positioned substantially along the first and second side edges, the first and second border walls having a width between approximately 10 microns and approximately 100 microns.

6. The slider of claim 2 wherein the funnel comprises:

a first arm and a second arm wherein each arm has a frontside, the frontside of the first arm extending relative to the longitudinal axis at a positive angle greater than zero degrees and less than 90 degrees and the frontside of the second arm extending relative to the longitudinal axis at a negative angle greater than zero degrees and less than 90 degrees.

7. The slider of claim 6 wherein each arm has a backside, the backside of the first arm extending relative to the longitudinal axis at a positive angle greater than zero degrees and less than 90 degrees and the backside of the second arm extending relative to the longitudinal axis at a negative angle greater than zero degrees and less than 90 degrees.

8. The slider of claim 2 wherein the pad is a center pad located along the longitudinal axis and proximate the trailing edge.

9. The slider of claim 2, and further comprising:
a trench positioned adjacent to the pad, the trench is recessed from the air bearing surface at a step depth.

10. The slider of claim 9 wherein the step depth is approximately 0.1 microns to approximately 0.3 microns.

11. The slider of claim 9 wherein the funnel directs air flow within the cavity from the leading edge to the trench.

12. A slider for supporting a transducing head proximate a rotating disc, the slider comprising:
a slider body having a disc opposing face bounded by a leading edge, a trailing edge, and first and second side edges, the slider body having a longitudinal axis;
an air bearing surface defined on the disc opposing face, the air bearing surface having at least one pad behind the leading edge;
a cavity positioned on the disc opposing face, wherein the cavity is at a cavity depth recessed from the air bearing surface, at least a portion of the cavity preceding the pad;
at least one trench positioned adjacent to the pad, the trench recessed from the air bearing surface at a step depth; and
a first arm and a second arm for funneling air flow within the cavity from the leading edge to the trench wherein the first arm and the second arm extend from the pad.

13. The slider of claim 12 wherein the cavity depth is approximately 1 micron to approximately 3 microns.

14. The slider of claim 12 wherein the step depth is approximately 0.1 microns to approximately 0.3 microns.

15. The slider of claim 12 wherein each arm has a frontside, the frontside of the first arm extending relative to the longitudinal axis at a positive angle greater than zero degrees and less than 90 degrees and the frontside of the second arm extending relative to the longitudinal axis at a negative angle greater than zero degrees and less than 90 degrees.

16. The slider of claim 12 wherein each arm has a backside, the backside of the first arm extending relative to the longitudinal axis at a positive angle greater than zero degrees and less than 90 degrees and the backside of the second arm extending relative to the longitudinal axis at a negative angle greater than zero degrees and less than 90 degrees.

17. A slider for supporting a transducing head proximate a rotating disc, the slider comprising:
a slider body having a disc opposing face bounded by a leading edge, a trailing edge, and first and second side edges, the slider body having a longitudinal axis;
an air bearing surface defined on the disc opposing face, the air bearing surface having at least one pad behind the leading edge;
a cavity positioned on the disc opposing face, wherein the cavity is recessed from the air bearing surface at a cavity depth, at least a portion of the cavity preceding the pad; and
a funnel directing air flow within the cavity from the leading edge to the pad wherein the funnel is recessed from the air bearing surface at a step depth.

18. A slider for supporting a transducing head proximate a rotating disc, the slider comprising:
a slider body having a disc opposing face bounded by a leading edge, a trailing edge, and first and second side edges, the slider body having a longitudinal axis;
an air bearing surface defined on the disc opposing face, the air bearing surface having at least one pad behind the leading edge;
a cavity positioned on the disc opposing face, wherein the cavity is recessed from the air bearing surface at a cavity depth, at least a portion of the cavity preceding the pad; and
a funnel directing air flow within the cavity from the leading edge to the pad, the funnel comprising a first arm extending from the pad and a second arm extending from the pad wherein each arm has a frontside, the frontside of the first arm extending relative to the longitudinal axis at a positive angle greater than zero degrees and less than 90 degrees and the frontside of the second arm extending relative to the longitudinal axis at a negative angle greater than zero degrees and less than 90 degrees.

19. A slider for supporting a transducing head proximate a rotating disc, the slider comprising:
a slider body having a disc opposing face bounded by a leading edge, a trailing edge, and first and second side edges, the slider body having a longitudinal axis;
an air bearing surface defined on the disc opposing face, the air bearing surface having at least one pad behind the leading edge;
a plurality of trenches positioned on the pad, the trenches are recessed from the air bearing surface;
a cavity positioned on the disc opposing face, wherein the cavity is recessed from the air bearing surface at a cavity depth, at least a portion of the cavity preceding the pad; and
a funnel directing air flow within the cavity from the leading edge to the pad.

20. The slider of claim 19, and further comprising:
a third arm and a fourth arm directing air flow within the cavity from the leading edge to the trench, the third arm and the fourth arm are recessed from the air bearing surface at a step depth.

* * * * *